United States Patent [19]

Parker

[11] Patent Number: 5,609,183
[45] Date of Patent: Mar. 11, 1997

[54] BUTTERFLY VALVE WITH SENSING COIL

[75] Inventor: Christopher J. Parker, Shrewsbury, England

[73] Assignee: BTR plc, London, England

[21] Appl. No.: 389,452

[22] Filed: Feb. 16, 1995

[30] Foreign Application Priority Data

Feb. 16, 1994 [GB] United Kingdom ............... 9402918

[51] Int. Cl.[6] .................. F16K 37/00; F16K 1/22
[52] U.S. Cl. ....................................... 137/554
[58] Field of Search ................. 137/554; 340/686

[56] References Cited

U.S. PATENT DOCUMENTS

| Re. 33,649 | 7/1991 | Kawai | 137/554 |
|---|---|---|---|
| 3,602,254 | 8/1971 | Fawkes. | |
| 4,468,559 | 8/1984 | Hurst et al. | 137/554 |
| 5,193,568 | 3/1993 | Eissenberg et al. | 137/554 |
| 5,471,138 | 11/1995 | Glass, III et al. | 137/554 |

FOREIGN PATENT DOCUMENTS 2142710 1/1985 United Kingdom ............ 137/554

*Primary Examiner*—Edward K. Look
*Assistant Examiner*—Michael S. Lee
*Attorney, Agent, or Firm*—Watson Cole Stevens Davis, P.L.L.C.

[57] ABSTRACT

This invention relates to a butterfly valve incorporating means for accurately sensing the position of the valve disc within the valve body. One or two coils are embedded within the valve seal. A current is generated within one of the coils and a sensor connected either to the same coil or the other coil measures the change in induction characteristics of the coil as the disc is moved. The signal sensed by the sensor is indicative of the disc position.

5 Claims, 2 Drawing Sheets

BUTTERFLY VALVE WITH SENSING COIL

BACKGROUND OF THE INVENTION

This invention relates to a butterfly valve.

A butterfly valve is usually supplied with either a manual or an automatic control mechanism. The latter is usually an electric or pneumatic actuator, activated by a positioning sensor working from the shaft of the actuator (which shaft is coupled to the valve spindle) or from end stops, indicating the limits of travel of the mechanism. However, since the sensor is spaced apart from and not attached directly to the valve disc, after a failure of the drive system an incorrect signal as to the disc position may be generated.

SUMMARY OF THE INVENTION

It is an object of the present invention to provide a butterfly valve in which this disadvantage is substantially reduced or overcome.

In accordance with the invention a butterfly valve comprises a body, an electrically conductive disc mounted to rotate between a closed position and an open position, a spindle driveably connected to the disc, an annular seal mounted within the body and sealingly engaged with the periphery of the disc when in a closed position, at least one coil mounted coaxially with the seal, a generator for generating an electrical current within the coil and a sensor capable of detecting an electrical signal from the coil indicative of the position of the disc.

Preferably the coil is positioned so as to be embedded within the material of the seal and will produce an inductance characteristic which will be affected by the position of the disc.

One embodiment of the invention will now be described by way of example only with reference to the accompanying drawings in which.

DETAILED DESCRIPTION OF PREFERRED EMBODIMENTS

Figure 1:
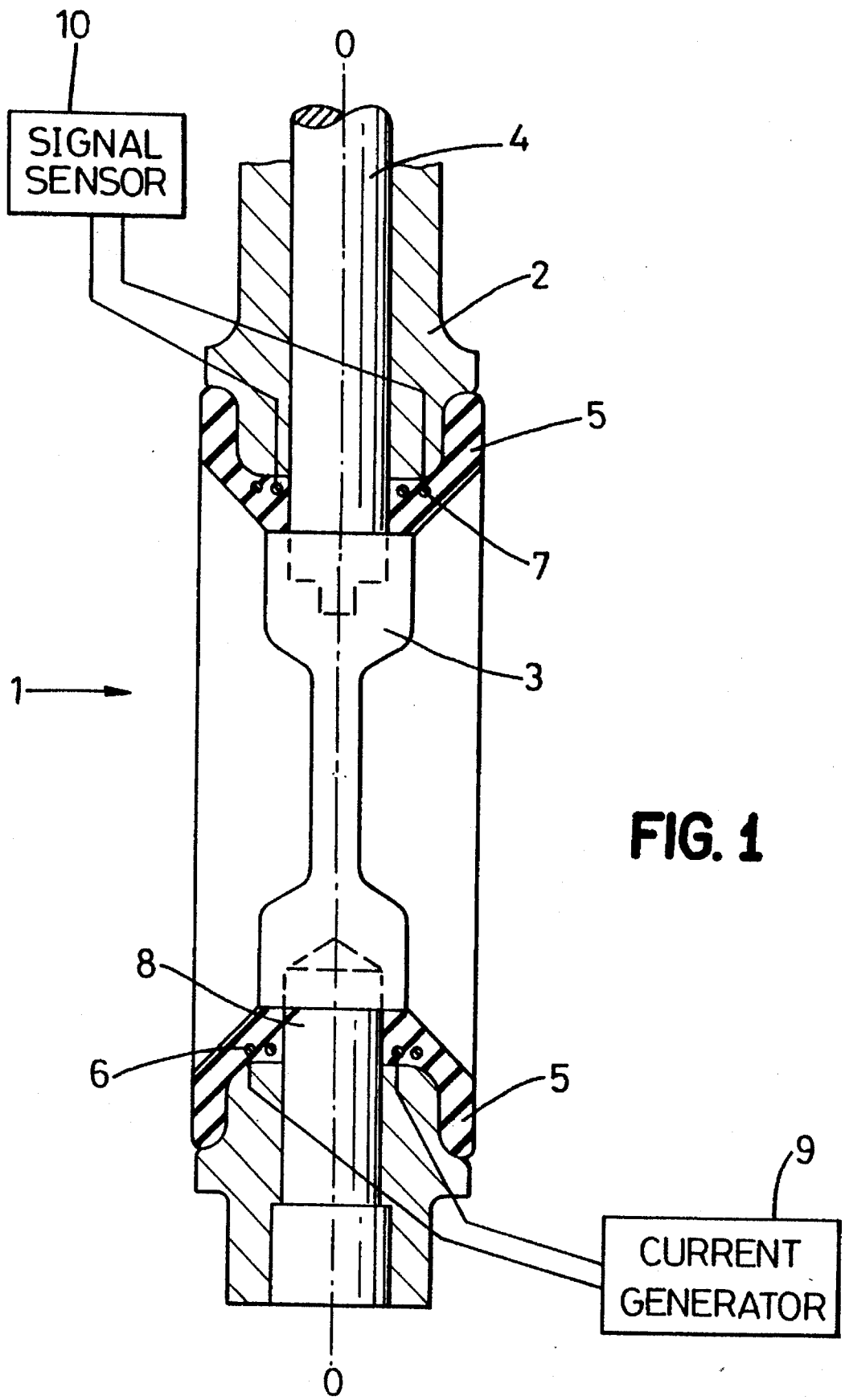
FIG. 1 shows a partial cross-sectional view through a butterfly valve and a block diagram of the current generator and disc position sensor.
Figure 2:
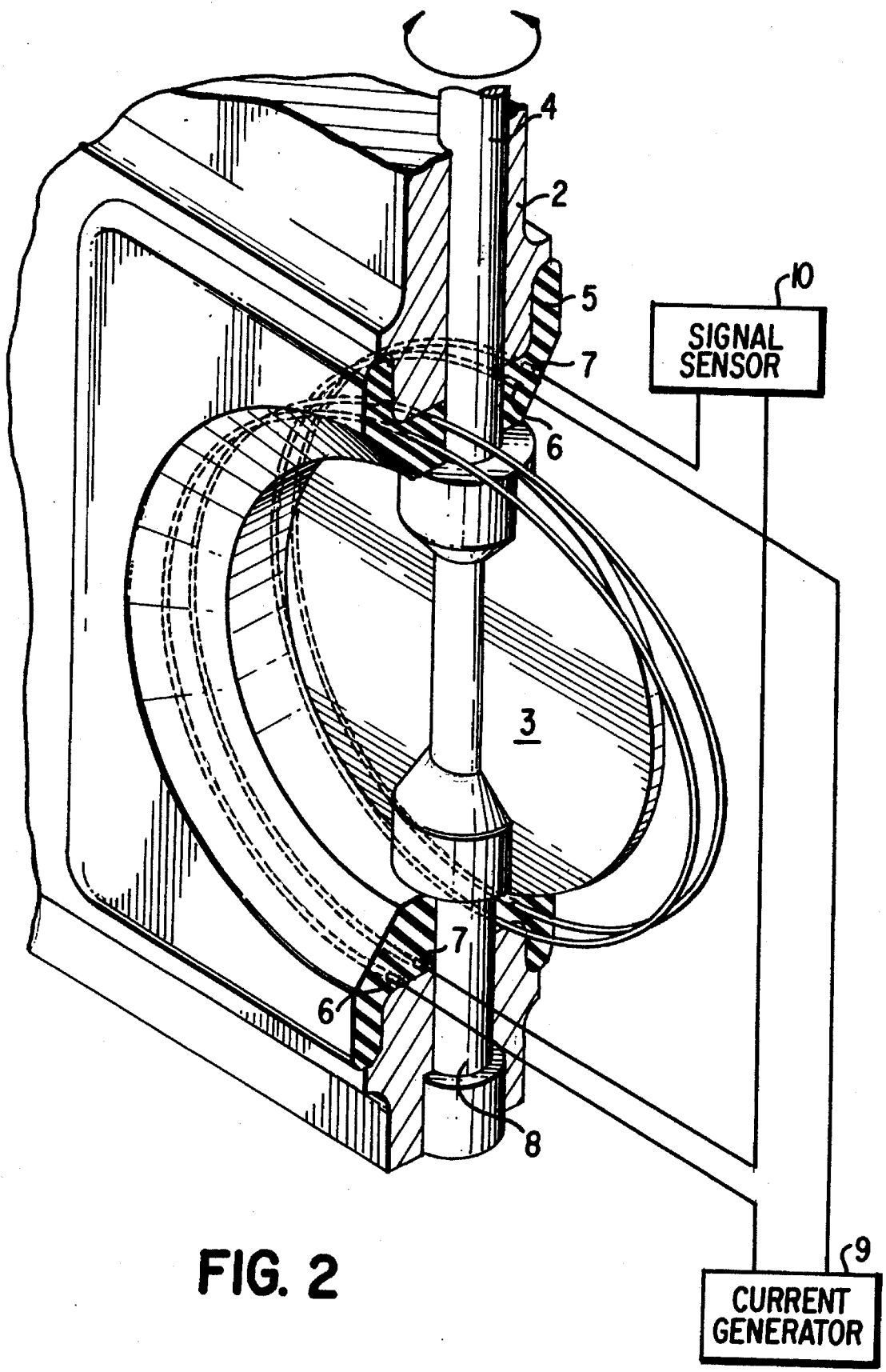
FIG. 2 is a perspective view, partly in section of the butterfly valve of FIG. 1 also in closed condition.

As shown, a butterfly valve in accordance with the invention comprises a cast iron body 2, with a flow path 1 therethrough a cast iron disc 3 which blocks said flow path in a closed condition of said valve, a steel drive spindle 4, an elastomeric seal 5 and two copper wire coils 6 and 7 embedded within the seal.

The valve disc 3 is caused to rotate by means of an actuator (not shown) connected to the upper end of the drive spindle 4, the rotational torque being transmitted to the disc 3 by the drive spindle 4. The disc is driveably connected to the lower end of the drive spindle 4 and is free to rotate on a stub shaft 8 diametrically opposite the drive spindle 4.

Positioned within the valve body 2 to surround the periphery of the disc is an annular seal of elastomeric material. When in the closed position (as shown in the drawing) the seal 5 engages the periphery of the disc 3. Embedded within the seal are two coils 6 and 7, effectively coaxial with the seal. The coils are wound together so that they lie in close proximity to each other and they are helically wound so as to pass from one side of the plane 0—0 to the other side of the plane 0—0.

One coil 6 is connected to a current generator 9 for creating an alternating current in the range 0–500 mA. The coil 7 is connected to a sensor 10 to measure the signal induced therein. This induced signal will vary depending on the position of the valve disc 3, and the sensor may be calibrated accordingly. For example it may be calibrated in degrees of arc, 0° indicating the closed position and 90° the fully open position.

In a modification to the embodiment, the two coils are replaced by a single coil connected to a current generator so the coil carries a signal of known characteristics. Movement of the disc will alter the self inductance of the coil and disc assembly and this will alter the signal characteristics by a measurable amount indicative of the disc angle. Thus the circuit acts as a comparator checking a set point against an actual value and displaying the difference as an angle.

Other electrical circuitry may be used as convenient.

What I claim is:

1. A butterfly valve comprising a body having a flow path therethrough, an electrically conductive disc mounted in said flow path to rotate between a closed position and an open position, a spindle drivably connected to the disc, an annular seal mounted within the body and around said flow path, said seal sealingly engaged with the periphery of the disc when in a closed position, at least one coil mounted coaxially with the seal around said flow path, a generator for generating an electrical current within the coil and a sensor capable of detecting an electrical signal from the coil indicative of the position of the disc.

2. A butterfly valve according to claim 1 wherein the coil is positioned so as to be embedded within the material of the seal, and is capable of producing an inductance characteristic which will be affected by the position of the disc.

3. A butterfly valve according to claim 1 wherein two coils are provided within the seal, effectively coaxial with the seal.

4. A butterfly valve according to claim 3 wherein the two coils are wound together whereby they lie in close proximity to each other and are wound so that a part of each coil lies on opposite sides of the axis of rotation of the valve disc.

5. A butterfly valve according to claim 3 wherein one coil is connected to the generator and the other coil is connected to the sensor.

* * * * *